United States Patent [19]

Sepp et al.

[11] 4,274,064
[45] Jun. 16, 1981

[54] APPARATUS FOR MECHANICALLY DECOUPLING A RESONATOR OF A GAS DYNAMIC LASER

[75] Inventors: Gunther Sepp, Ottobrunn; Gunthard Born, Taufkirchen; Werner Malburg, Neubiberg, all of Fed. Rep. of Germany

[73] Assignee: Messerschmitt-Bolkow-Blohm GmbH, Munich, Fed. Rep. of Germany

[21] Appl. No.: 922,210

[22] Filed: Jul. 6, 1978

[30] Foreign Application Priority Data

Jul. 12, 1977 [DE] Fed. Rep. of Germany ....... 2731346

[51] Int. Cl.³ .............................................. H01S 3/02
[52] U.S. Cl. .............................................. 331/94.5 G
[58] Field of Search .................... 331/94.5 C, 94.5 D, 331/94.5 G

[56] References Cited

U.S. PATENT DOCUMENTS 3,858,122  12/1974  Angelbeck et al. ............ 331/94.5 D Primary Examiner—William L. Sikes
Attorney, Agent, or Firm—W. G. Fasse; D. F. Gould

[57] ABSTRACT

The resonator of a gas dynamic laser, particularly, of a high power gas dynamic laser, is mechanically decoupled from the other components of the laser by a pair of elastic restoring ring membranes and stay bolts. The flow channel of the laser is mechanically connected through the ring membranes to the resonator. A pair of tubular, elastic sleeve membranes seal the flow channel in a vacuum tight manner. The laser beam decoupling elements are secured to bushings extending coaxially through said elastic tubular sleeve membranes. The restoring forces of the ring membranes are large relative to the differential force resulting from said tubular sleeve sealing membranes.

5 Claims, 1 Drawing Figure

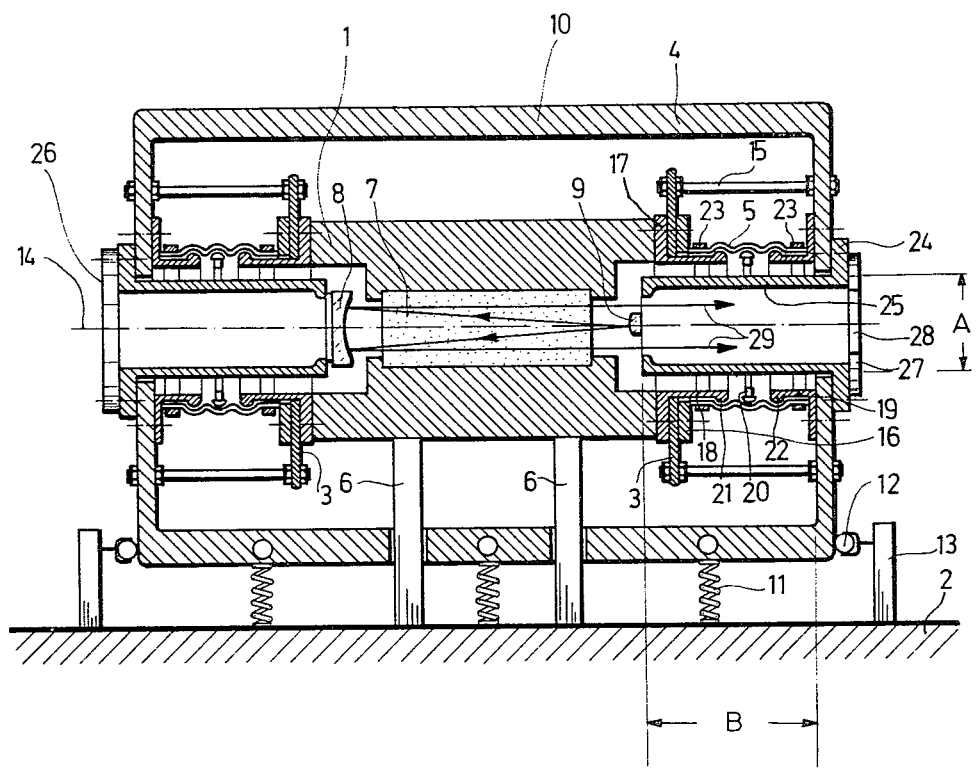

APPARATUS FOR MECHANICALLY DECOUPLING A RESONATOR OF A GAS DYNAMIC LASER

BACKGROUND OF THE INVENTION

The present invention relates to an apparatus for mechanically decoupling the resonator means of a gas dynamic laser from the other components of said gas dynamic laser, especially a high power gas dynamic laser. The resonator means extend at both sides through the structural components carrying the laser medium, whereby the zones through which the resonator means penetrate into the laser medium carrying components are elastically sealed in a vacuum tight manner. Further, the resonator means are connected through spring and damping elements with a supporting structure such as a floor.

An effective mechanical decoupling between the resonator means and the remaining components of a laser is of controlling importance especially in high power lasers. When dimensioning the resonator of such lasers it is namely necessary to take two essential considerations into account:

first, one must consider the high noise level as compared to other lasers due to the high flow speeds and the large body noise resulting therefrom in a gas dynamic laser; and second, the large cross-dimensions of the resonator mirrors relative to the mirror spacing must also be taken into account for these resonators having a high Fresnel-number.

Both of the just mentioned features require:

(a) an extraordinarily rigid structure for securing the resonator mirror to reduce the mirror vibrations to a minimum; and (b) an effective mechanical decoupling of the resonator structural components from the remaining members of the laser which decoupling must prevent the transmission of body noise to the resonator.

In this type of laser the resonator mirrors are normally located immediately opposite the laser medium. Therefore, it is necessary that the structure carrying the mirrors penetrates at one or several points through the structure guiding the laser medium. Thus, a mechanical decoupling of the resonator from the remaining laser components requires a vacuum tight, elastic construction of the penetration zones so that the resonator may oscillate with a certain degree of motion freedom relative to a normal position due to the elastic coupling between the resonator and the remaining laser components. The resulting oscillations are damped in a suitable manner.

Prior art devices relevant to this particular type of laser structure have the disadvantage that the construction of the resonator frame carrying the mirror could not be made rugged enough because the elastic coupling and sealing used in the prior art did not permit a resonator mirror support structure having a large cross section. Please see in this respect especially U.S. Pat. No. 3,858,122.

A further disadvantage of prior art devices is seen in that the elastical coupling elements between the resonator and the remaining components of the laser are not arranged symmetrically relative to the resonator axis. Such elastic coupling elements cause the restoring force between the resonator and the remaining components. Thus, the resulting restoring forces are not exactly effective toward the normal position of the resonator axis. As a result, during the operation complicated superimposed or heterodyning oscillations are encountered instead of the simple normal oscillations of the resonator relative to the remaining laser components. In connection with such superimposed oscillations, however, the mean or average deviation of the resonator axis from the normal position is larger than in connection with normal oscillations. Such large mean deviation is a disadvantage for the power and optical quality of the decoupled laser beams due to the large mean misadjustments of the resonator relative to the flow channel and thus relative to the laser medium.

OBJECTS OF THE INVENTION

In view of the above it is the aim of the invention to achieve the following objects singly or in combination:

to avoid the disadvantages of the prior art, more specifically, to provide a mechanical decoupling of a laser resonator which is more rigidly supported as compared to prior art teachings;

to construct the penetration components of the laser resonator which penetrate into the laser medium flow means in such a manner that the penetration elements have a large cross-section relative to prior art structures and that they are symmetric at both ends of the laser;

to separately solve the two problems, namely, the elastic and damped coupling on the one hand between the laser resonator and the laser flow channel means and, on the other hand, the problem of sealing the penetration zones between resonator components and the flow channel components in a vacuum tight manner; and to minimize the shifting of the normal position of the laser so that the freedom of motion of the resonator is reduced as little as possible.

SUMMARY OF THE INVENTION

According to the invention there is provided an apparatus for mechanically decoupling the resonator means of a gas dynamic laser, especially a high power gas dynamic laser, from the other components of the gas dynamic laser, wherein the zones of penetration between the resonator components and the flow channel means have a large cross sectional area and are preferably of rotational symmetry relative to the longitudinal resonator axis. The zones of penetration are constructed in such a manner that the resonator is connected to the wall of the flow channel by means of a ring disk operating as a restoring and damping membrane. The flow channel is rigidly connected to a support such as the floor. Further, the resonator or rather, resonator components are connected with the flow channel to a flexible sealing unit at each end, whereby the vacuum tight sealing is accomplished solely by the flexible sealing units, and whereby the restoring and damping membrane has a large spring constant relative to the sealing unit and relative to the spring and damping elements by means of which the resonator or resonator frame is connected to a support structure such as the floor.

The essential advantage of the teaching according to the invention is seen in that it is now possible to construct the penetration zones to have a large cross section and to be symmetrical relative to each other, whereby very rigid resonators may be used. Another advantage of the invention is seen in that the elastic, damped couplings and thus also the body noise reduction is accomplished independently of the sealing of the penetration zones, whereby the coupling as well as the sealing may be constructed in an optimal manner independently of each other.

Since, according to the invention the restoring and damping membrane does not have to perform any sealing functions, it may be constructed solely in accordance with the requirements dictated by the desired optimal oscillation frequency, the oscillation amplitudes, and the oscillation damping. If the membrane is constructed, for example, as an elastic, ring-shaped disk which is clamped at the inner diameter and at the outer diameter, it becomes possible to determine, for a given resonator, the oscillation characteristics relative to oscillations directed in the direction of the resonator axis as well as perpendicularly thereto by suitably selecting the outer and inner diameter, the thickness and the material of said ring shaped disk membrane. For example, the membrane may be made of rubber.

BRIEF FIGURE DESCRIPTION

In order that the invention may be clearly understood, it will now be described, by way of example, with reference to the accompanying drawings, wherein the single FIGURE illustrates an axial, sectional view through a laser constructed in accordance with the invention.

DETAILED DESCRIPTION OF PREFERRED EXAMPLE EMBODIMENTS

The FIGURE illustrates only those components which are necessary for the illustration of the present invention. Thus, the flow channel 7 for the laser medium is formed by the walls 1 connected to the expansion nozzles of a gas dynamic laser. The expansion nozzles are not shown. The flow channel 7 or rather, its wall 1 is rigidly connected to a support structure such as the floor 2 by means of posts 6. The laser medium such as a gas moves perpendicularly to the plane of the drawings inside the flow channel 7.

The resonator 4 is, as shown in the drawing, a rigid structural component which carries the laser beam decoupling mirrors 8 and 9. The resonator 4 comprises several individual components, namely, an oscillation frame 10 and vibrations damping springs 11 which connect the oscillation frame 10 to the floor 2. Further, the oscillation frame 10 is guided relative to lateral vibrations in the direction of the longitudinal axis 14, by means of spring and damping elements 12 which are secured to spring and damping elements 13 which in turn are connected to the floor 2.

The oscillation frame 10 carries a restoring and damping membrane 3 adjacent each end by means of stay bolts 15 concentrically arranged relative to the longitudinal axis 14 of the resonator 4 and the flow channel 7.

The restoring force and damping membrane 3 is constructed as a ring disk having a hole or inner diameter rigidly connected to the wall 1 of the flow channel 7. This rigid connection is accomplished by means of a pressure ring 16 secured by bolts threaded, for example, into the wall 1 of the flow channel. Between the wall 1 and the membrane 3 there is also arranged a flange 17 which clamps the membrane 3 between itself and the pressure ring 16. The screws rigidly press the flange 17 against the wall 1 of the flow channel 7.

The flange 17 is provided with an axially, outwardly extending pipe section 18. A further pipe section 19 and respective flange has a configuration substantially mirror-symmetrical relative to the pipe section 18 and flange 17. The pipe section 19 is rigidly secured to the oscillation frame 10 of the resonator 4. Both pipe sections 18 and 19 are preferably constructed as concentric pipe nipples which are provided in an advantageous manner with a ring bulge running around the axially outer end of each nipple which ends face each other with the respective ring bulge 21, 22. Stated differently, the pipe nipples are axially aligned relative to the longitudinal axis 14 adjacent each end of the flow channel wall 1. Both nipples 18 and 19 are connected to each other by means of a tubular, flexible bellows membrane 5 which provides an elastic and vacuum tight connection and seal. In order to avoid the shrinking of the tubular bellows membrane 5 in operation, a support ring 20 is arranged inside the bellows membrane 5 intermediate the nipples 18 and 19 which do not contact the support rings 20. The tubular bellows membrane 5 may be secured on the pipe nipples 18 and 19 by means of hose clamps 23 of conventional construction.

The resonator further comprises bushing means including pipe sections 25 and flanges 24. The pipe sections 25 extend freely through the nipples 18 and 19. The flanges 24 are secured by conventional means to the side walls of the resonator frame 10, so that the pipe sections 25 extend concentrically relative to the resonator axis 14. The laser decoupling mirrors 8 and 9 are connected in an adjustable and conventional manner to the inwardly pointing ends of the pipe section 25 at each end of the flow channel 7. It will be noted that all structural components of the laser are centrally oriented relative to the longitudinal axis 14 as is known in the art.

The elements 14, 18, 21, 19, 22, 20, 24, and 25 and the respective connecting elements such as the tubular bellows membrane 5 and the hose clamps 23, as well as other elements are preferably constructed as concentric rotary parts which may be produced on a lathe.

The laser resonator and structure according to the invention shown in the drawing is dimensioned in such a manner that the dimension, such as the diameter A in the lateral walls of the laser frame 10 is as large as possible relative to the effective length B of the pipe section 25 inside the laser resonator frame 10. A practically advantageous ratio of the dimensions A to B is preferably 0.5. In any event, this ratio is such that a high stiffness of the resonator mirror mountings is assured.

Incidentally, the restoring force of the ring disk membrane 3 in conjunction with the springs 11 and the elastic sealing means 5 should be in a range where the eigenfrequencies of the oscillating frame 10 are of the order of 10 Hz and thereby remaining substantially below the frequencies of the disturbing vibrations of the laser gas as well as the walls 1 and the floor 2.

The free space between the pipe section 25 and the nipples 18 and 19 and the spacer ring 20 must be large enough so that during operation, when the resonator 4 moves, no contact will take place between the wall 1 of the flow channel 7 and the resonator components.

The described laser structure assures a vacuum tight connection between the flow channel 7 and the environment of the flow channels 7 as well as an elastic connection between the wall 1 of the flow channel 7 and the resonator 4. The pipe sections 25 are closed in a vacuum tight manner through the flanges 26 or through the window flange 27 as shown at the right hand end of the drawings. The window flange 27 is provided with an exit window 28 for the laser radiation 29 and also seals the inside of the laser structure in a vacuum tight manner. Thus, the flow channel 7 is also sealed in a vacuum tight manner relative to the environment.

As part of the disclosure of the present invention it is to be noted that during the operation of the laser, a high reduced pressure prevails in the flow channel 7 relative to the environment so that in the zones of penetration between the resonator components and the flow channel, forces occur which provide a differential force that is normally different from zero. As a result, the resonator components take up a new normal position relative to the flow channel 7. Such new position diminishes the freedom of motion of the resonator 4 and its components. Therefore, the invention aims at keeping this shifting of the normal position small. The differential force is thus to be kept as small as possible relative to the normal restoring force of the ring membrane 3. Thus, the differential force shall be smaller or at the most comparable to the forces that may be taken up by the flexible sealing units 5 including said bellows membrane 5. The invention satisfies the just mentioned condition in a simple, surprising manner on the one hand by the symmetric arrangement of the respective elements at both penetration zones, and on the other hand, by means of the support ring 20 located intermediate the ends of the flexible bellows membrane 5 and inside of the membrane 5. By means of the ring 20 a relatively large freedom of motion is provided for the resonator 4 because the spacing between the inner ends adjacent the beads 21 and 22 of the pipe sections 18 and 19 may thus be larger since the spacing is covered by the bellows sealing unit 5. On the other hand, the deformation of the sleeve bellows 5 due to the vacuum therein is small because the support ring 20 minimizes such deformation. Thus, even in this respect the differential force may be held small also due to the respectively selected symmetric construction of the just described elements.

Although the invention has been described with reference to specific example embodiments, it will be appreciated, that it is intended to cover all modifications and equivalents within the scope of the appended claims.

What is claimed is:

1. An apparatus for mechanically decoupling the resonator means (4) for resonating the laser vibration in a gas dynamic laser from other components of said gas dynamic laser, comprising laser medium flow channel means (7) for flowing a laser medium therethrough, said laser medium flow channel means having a longitudinal axis as well as first and second open ends, elastic sealing means (5) operatively connected to said resonator means (4) and to said first and second open ends of said flow channel means (7) for sealing said flow channel means from said resonator means in a vacuum tight manner, base means (2) for operatively supporting said resonator means, support means (6) for rigidly securing said flow channel means to said base means, damping means (11, 12, 13) for operatively connecting said resonator means (4) to said base means (2), and securing means (15, 3) including ring disk membrane means (3) for operatively securing said first and second open ends of said flow channel means (7) to said resonator means (4), said ring disk membrane means (3) having a given first spring stiffness for applying a damping and restoring action to said resonator means, said elastic sealing means (5) and said damping means (11, 12, 13) having a second given spring stiffness smaller than said given first spring stiffness of said ring disk membrane means (3), whereby the sealing action of said elastic sealing means (5) is substantially independent of said damping and restoring action of said ring disk membrane means (3).

2. The apparatus of claim 1, wherein said flow channel means comprise an end wall extending axially at each end of said flow channel means, said elastic sealing means comprising sleeve bellows membrane means for sealing said flow channel means, said apparatus further comprising means for connecting said sleeve bellows membrane means to said resonator means at one end of each sleeve bellows membrane means and to said flow channel end wall means at the other end of each sleeve bellows membrane means, said sleeve bellows membrane means having a spring stiffness smaller than said given first spring stiffness of said ring disk membrane means.

3. The apparatus of claim 1, wherein said securing means including said ring disk membrane means (3) for operatively securing said first and second open ends of said flow channel means to said resonator means (4) are arranged concentrically relative to said longitudinal axis and symmetrically relative to each other adjacent to said first and second open ends, said resonator means having lateral end walls and holes in said lateral walls, said holes extending coaxially to said longitudinal axis, said coaxial holes having a given diameter A, and a bushing (25) secured to said lateral walls of said resonator means (4), said bushing extending coaxially through said coaxial holes, laser mirror means for decoupling the laser beam, said laser mirror means being operatively secured to said bushing, said bushing having a given operational length B axially inside said resonator means such that said diameter A is smaller than said length B.

4. The apparatus of claim 3, wherein said elastic sealing means comprise sleeve bellows membrane means (5), said bushing means extending coaxially through said sleeve bellows membrane means.

5. The apparatus of claim 1, wherein said elastic sealing means comprise sleeve bellows membrane means for sealing said flow channel means (5), said apparatus further comprising support ring means (20) operatively located inside said sleeve bellows membrane means out of contact with said gas dynamic laser for properly positioning said sleeve bellows membrane means.

* * * * *